(12) United States Patent
Sugaya

(10) Patent No.: US 8,558,670 B2
(45) Date of Patent: Oct. 15, 2013

(54) ELECTRIC POWER COMMUNICATION DEVICE, ELECTRIC POWER COMMUNICATION SYSTEM, ELECTRIC POWER COMMUNICATION METHOD, AND PROGRAM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 513 days.

(21) Appl. No.: 12/578,928

(22) Filed: Oct. 14, 2009

(65) Prior Publication Data

US 2010/0109843 A1    May 6, 2010

(30) Foreign Application Priority Data

Nov. 4, 2008   (JP) ................. 2008-283430

(51) Int. Cl.
| | | |
|---|---|---|
| H04Q 5/22 | (2006.01) | |
| G08B 13/14 | (2006.01) | |
| H01Q 21/00 | (2006.01) | |
| H04M 1/00 | (2006.01) | |
| H04B 1/00 | (2006.01) | |
| H04J 3/00 | (2006.01) | |

(52) U.S. Cl.
USPC .......... 340/10.1; 340/572.1; 340/539.11; 343/726; 343/728; 343/741; 343/757; 455/575.7; 455/25; 455/63.4; 455/562.1; 370/280

(58) Field of Classification Search
USPC .................................................. 340/10.1
See application file for complete search history.

(56) References Cited

U.S. PATENT DOCUMENTS

| | | | |
|---|---|---|---|
| 5,719,586 A * | 2/1998 | Tuttle ................... | 343/726 |
| 6,493,545 B1 * | 12/2002 | Sugaya ................. | 455/272 |
| 7,263,386 B2 * | 8/2007 | Dacosta ................ | 455/562.1 |
| 7,274,294 B2 * | 9/2007 | Heinze et al. ........ | 340/572.1 |
| 7,570,150 B2 * | 8/2009 | Cargonja et al. .... | 340/10.33 |
| 7,977,947 B1 * | 7/2011 | Jones et al. .......... | 324/522 |
| 8,174,383 B1 * | 5/2012 | Chung et al. ........ | 340/572.1 |
| 2002/0119808 A1 * | 8/2002 | Seiki ..................... | 455/575 |

(Continued)

FOREIGN PATENT DOCUMENTS

| | | |
|---|---|---|
| JP | 8-33244 | 2/1996 |
| JP | 2000-151642 | 5/2000 |

(Continued)

OTHER PUBLICATIONS

Office Action issued Sep. 7, 2010, in Japanese Patent Application No. 2008-283430.

(Continued)

Primary Examiner — Jennifer Mehmood
Assistant Examiner — Fekadeselassie Girma
(74) Attorney, Agent, or Firm — Oblon, Spivak, McClelland, Maier & Neustadt, L.L.P.

(57) ABSTRACT

An electric power communication device includes a plurality of directional antennas, a plurality of electric power communication portions, and an electric power communication control portion. Each of the plurality of directional antennas has directionality, and each of the plurality of electric power communication portions has directionality. The electric power communication control portion controls which of the plurality of electric power communication portions is used for electric power communication with a partner communication device, in accordance with the directional antenna, among the plurality of directional antennas, for which receiving of an incoming wireless signal that was transmitted from the partner communication device has been detected.

9 Claims, 10 Drawing Sheets

(56) References Cited

U.S. PATENT DOCUMENTS

| | | | |
|---|---|---|---|
| 2005/0245224 A1* | 11/2005 | Kurioka | 455/272 |
| 2007/0291668 A1* | 12/2007 | Duan | 370/280 |
| 2009/0121835 A1* | 5/2009 | Borret et al. | 340/10.1 |
| 2010/0141450 A1* | 6/2010 | Nagai | 340/572.1 |
| 2010/0225480 A1* | 9/2010 | Bloy et al. | 340/572.1 |

FOREIGN PATENT DOCUMENTS

| | | |
|---|---|---|
| JP | 2001-231186 | 8/2001 |
| JP | 2004-328941 | 11/2004 |
| JP | 2005-62952 | 3/2005 |
| JP | 2006-296123 | 10/2006 |

OTHER PUBLICATIONS

Office Action issued on Jun. 7, 2011 in the corresponding Japanese Patent Application No. 2008-283430.

* cited by examiner

FIG. 5

| Element ID | Length | Power Supply Type | Available Power Level |
|---|---|---|---|
| 431 | 432 | 433 | 434 |

FIG. 6

| Element ID | Length | Request DevAddr | Request Power | Request Duty Cycle |
|---|---|---|---|---|
| 441 | 442 | 443 | 444 | 445 |

FIG. 7

| Element ID | Length | Target DevAddr | Transmit Availability MAS Bitmap |
|---|---|---|---|
| 451 | 452 | 453 | 454 |

FIG. 12

| SLOT NUMBER | USAGE STATE | ADDRESS | MOVING DISPLAY | RECEIVING DIRECTION MAP | APPLICATION PARAMETER |
|---|---|---|---|---|---|
| 0 | Non | Non | Non | Non | Non |
| 1 | Non | Non | Non | Non | Non |
| 2 | IN USE | 0x2222 | NONE | 270 | Video Stream |
| 3 | SELF-USE | 0x3333 | NONE | N/A | WUSB |
| 4 | IN USE | 0x4444 | NONE | 90 | IP Connection |
| 5 | IN USE | 0x5555 | NONE | 180 | WUSB |
| 6 | PROXIMATE DETECTION | 0x1111 | NONE | OUT OF RANGE | UNDETERMINED |
| 7 | Non | Non | Non | Non | Non |
| 8 | Non | Non | Non | Non | Non |

ELECTRIC POWER COMMUNICATION DEVICE, ELECTRIC POWER COMMUNICATION SYSTEM, ELECTRIC POWER COMMUNICATION METHOD, AND PROGRAM

BACKGROUND OF THE INVENTION

1. Field of the Invention

The present invention relates to an electric power communication device, an electric power communication system, an electric power communication method, and a program.

2. Description of the Related Art

In the WiMedia Distributed MAC Specification, a method is described for building an autonomous distributed wireless network by having individual wireless communication devices exchange beacon signals on a specified cycle. A method is also described for forming a superframe cycle on a specified cycle, placing a beacon period that includes a plurality of beacon slots in the beginning portion of the superframe cycle, and determining which beacon slot each of the wireless communication devices will use. Note that it is assumed that transmission and receiving of the beacons will be performed by non-directional antennas.

In addition, an electric power transmission technology for transmitting electric power among a plurality of electric power communication devices has recently been proposed. According to the electric power transmission technology, electric power transmission from one of the electric power communication devices to another of the electric power communication devices is performed in a case where the plurality of the electric power communication devices are disposed such that they have specific positional relationships. Further, according to the electric power transmission technology, it is possible, for example, for transmission of several milliwatts to several hundred milliwatts to be performed within a short range of several meters. Note that a method for managing positions of a plurality of communication devices is described in Japanese Patent Application Publication No. JP-A-2005-62952.

SUMMARY OF THE INVENTION

However, a problem exists with the electric power communication devices described above in that it is difficult to perform electric power transmission between electric power communication devices that are disposed in unspecified directions.

Accordingly, the present invention addresses this issue and provides an electric power communication device, an electric power communication system, an electric power communication method, and a program that are new and improved and are capable of performing electric power transmission by appropriately controlling directionality between partnered communication devices.

In order to address the issue described above, according to a first aspect of the present invention, there is provided an electric power communication device that includes a plurality of directional antennas, a plurality of electric power communication portions, and an electric power communication control portion. Each of the plurality of directional antennas has directionality, and each of the plurality of electric power communication portions has directionality. The electric power communication control portion controls which of the plurality of electric power communication portions is used for electric power communication with a partner communication device, in accordance with the directional antenna, among the plurality of directional antennas, for which receiving of an incoming wireless signal that was transmitted from the partner communication device has been detected.

The electric power communication device may also include a receiving detection portion and an antenna control portion. The receiving detection portion detects the receiving of the incoming wireless signal by a single antenna, and the antenna control portion sequentially switches the single antenna among the plurality of directional antennas.

The electric power communication device may also include a non-directional antenna, and the antenna control portion may sequentially switch the single antenna among the plurality of directional antennas and the non-directional antenna.

The electric power communication control portion may also use for the electric power communication with the partner communication device the electric power communication portion whose directionality is closest to that of the directional antenna whose receiving of the incoming wireless signal has been detected by the receiving detection portion.

Transmitting of an outgoing wireless signal may also be performed by the non-directional antenna.

Based on the incoming wireless signal that was transmitted from the partner communication device, the receiving detection portion may also detect a time slot in which the incoming wireless signal will be transmitted later from the partner communication device. The antenna control portion may also switch the single antenna for the time slot that has been detected by the receiving detection portion to the directional antenna whose receiving of the incoming wireless signal that was transmitted from the partner communication device has been detected.

In order to address the issue described above, according to another aspect of the present invention, there is provided an electric power communication system that includes a first electric power communication device and a second electric power communication device. The second electric power communication device includes a plurality of directional antennas, a plurality of electric power communication portions, and an electric power communication control portion. Each of the plurality of directional antennas has directionality, and each of the plurality of electric power communication portions has directionality. The electric power communication control portion controls which of the plurality of electric power communication portions is used for electric power communication with the first communication device, in accordance with the directional antenna, among the plurality of directional antennas, for which receiving of an incoming wireless signal that was transmitted from the first communication device has been detected.

In order to address the issue described above, according to another aspect of the present invention, there is provided an electric power communication method that includes a step of transmitting of an incoming wireless signal from a partner communication device. The electric power communication method also includes a step of detecting receiving of the incoming wireless signal by one of a plurality of directional antennas. The electric power communication method also includes a step of controlling which of a plurality of electric power communication portions, each of which has directionality, is used for electric power communication with a partner communication device, in accordance with the one of the plurality of directional antennas for which receiving has been detected.

In order to address the issue described above, according to another aspect of the present invention, there is provided a program that causes a computer to perform a step of detecting that an incoming wireless signal that has been transmitted by a partner communication device has been received by one of a plurality of directional antennas. The program also causes the computer to perform a step of controlling which of a plurality of electric power communication portions, each of which has directionality, is used for electric power communication with the partner communication device, in accordance with the one of the plurality of directional antennas for which receiving has been detected.

The electric power communication device, the electric power communication system, the electric power communication method, and the program according to the present invention that are described above make it possible to perform electric power transmission by appropriately controlling directionality between partnered communication devices.

BRIEF DESCRIPTION OF THE DRAWINGS

FIG. 5 is an explanatory figure that shows an example of a configuration of an electric power supply capability information element;

FIG. 6 is an explanatory figure that shows an example of a configuration of an electric power transmission request information element;

FIG. 7 is an explanatory figure that shows an example of a configuration a transmission MAS notification information element;

FIG. 12 is an explanatory figure that shows a concrete example of a control table that is managed by a network management portion;

DETAILED DESCRIPTION OF THE PREFERRED EMBODIMENTS

Figure 1:
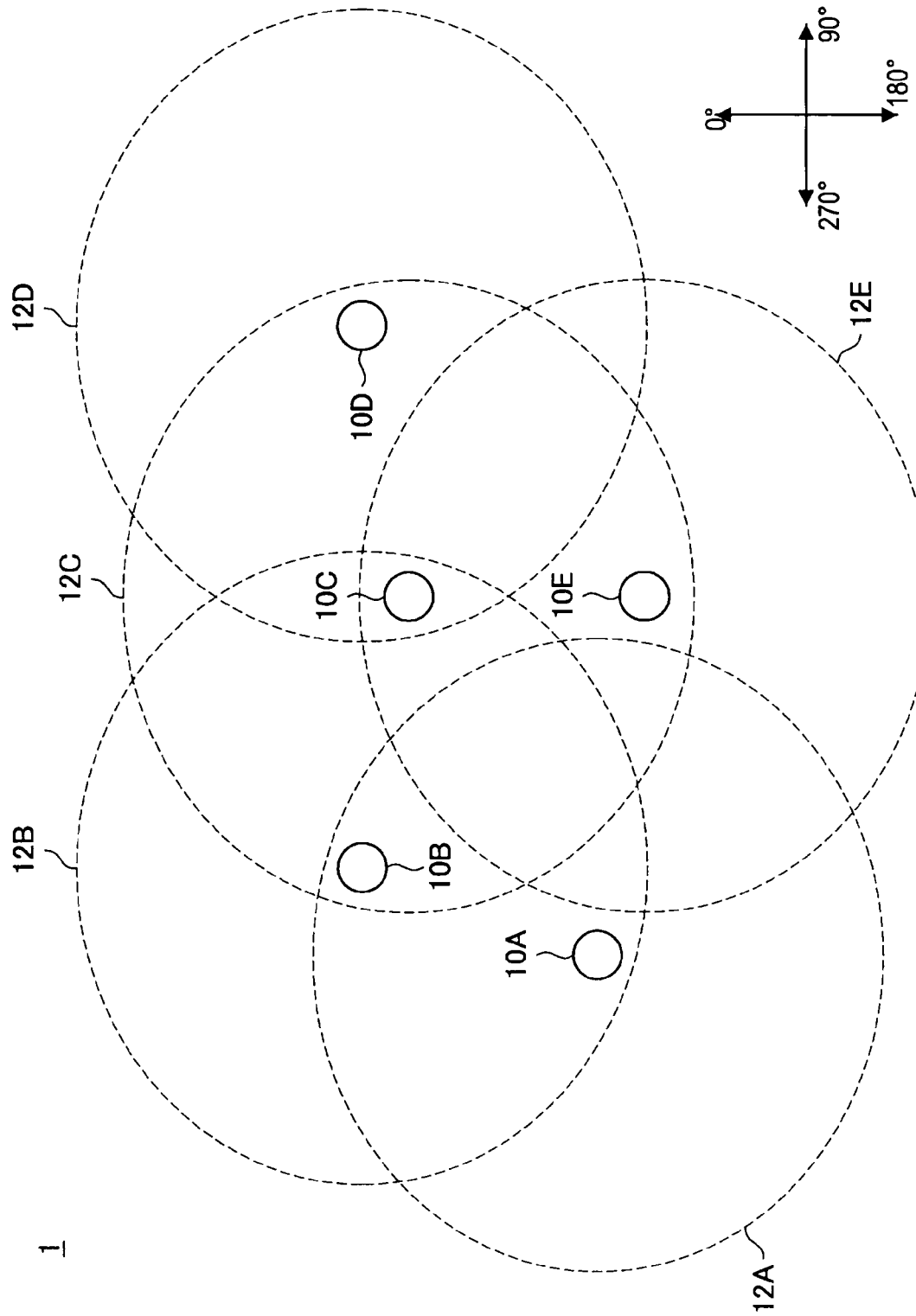
FIG. 1 is an explanatory figure that shows a configuration of a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be explained under the headings listed below.

1. Overview of a Wireless Communication System According to the Present Embodiment
   Example of Configuration of the Wireless Communication System
   Time Division Control
   Configurations of Beacon and Information Elements
2. Background
3. Configuration of a Wireless Communication Device According to the Present Embodiment
4. Operation of the Wireless Communication Device According to the Present Embodiment
5. Conclusion and Supplement
1. Overview of a Wireless Communication System According to the Present Embodiment
—Example of Configuration of the Wireless Communication System First, an example of a configuration of a wireless communication system 1 according to the present embodiment will be explained with reference to FIG. 1.

FIG. 1 is an explanatory figure that shows the configuration of the wireless communication system 1 according to the present embodiment. The wireless communication system 1 includes wireless communication devices 10A to 10E. The wireless communication devices 10A to 10E can respectively perform communications in an autonomous, distributed manner with wireless communication devices that reside within radio wave ranges 12A to 12E. Each of the wireless communication devices 10A to 10E also functions as an electric power communication device that performs electric power transmission.

Specifically, the wireless communication device 10A is capable of wireless communication with the wireless communication device 10B, which resides within the radio wave range 12A. The wireless communication device 10B is capable of wireless communication with the wireless communication device 10A and 10C, which reside within the radio wave range 12B. The wireless communication device 10C is capable of wireless communication with the wireless communication device 10B, 10D, and 10E, which reside within the radio wave range 12C.

In the same manner, the wireless communication device 10D is capable of wireless communication with the wireless communication device 10C, which resides within the radio wave range 12D. The wireless communication device 10E is also capable of wireless communication with the wireless communication device 10C, which also resides within the radio wave range 12E.

More specifically, in FIG. 1, in relation to the wireless communication device 10C, the wireless communication device 10D is located approximately in the 90-degree direction, the wireless communication device 10E is located approximately in the 180-degree direction, and the wireless communication device 10B is located approximately in the 270-degree direction.

Further, the wireless communication devices 10A to 10E configure the autonomous, distributed wireless communication system 1 by transmitting and receiving, on a specific cycle, beacons that serve as examples of communications management information. Each of the wireless communication devices 10A to 10E that configure the wireless communication system 1 can transmit and receive various types of data. The various types of data may include audio data such as music, lectures, radio programs, and the like, video data such as motion pictures, television programs, video programs, photographs, text, paintings, diagrams, and the like, and miscellaneous data such as games, software, and the like.

Note that hereinafter, in a case where there is no particular need to distinguish among the wireless communication devices 10A to 10E, each will simply be called the wireless communication device 10, and in a case where there is no particular need to distinguish among the radio wave ranges 12A to 12E, each will simply be called the radio wave range 12.

The wireless communication device 10 may be an information processing device, such as a personal computer (a PC), a home video processing device (a DVD recorder, a videotape deck, or the like), a mobile telephone, a Personal Handyphone System (a PHS), a mobile audio playback device, a mobile image processing device, a personal digital assistant (a PDA), a home game unit, a mobile game unit, a household appliance, or the like. The wireless communication device 10 may also be one of externally connected to and built into these sorts of information processing devices that function as application devices.

—Time Division Control

An example of the configuration of the autonomous, distributed wireless communication system 1 has been explained above. Next, a superframe for time division control in the wireless communication system 1 will be explained with reference to FIG. 2.

Figure 2:
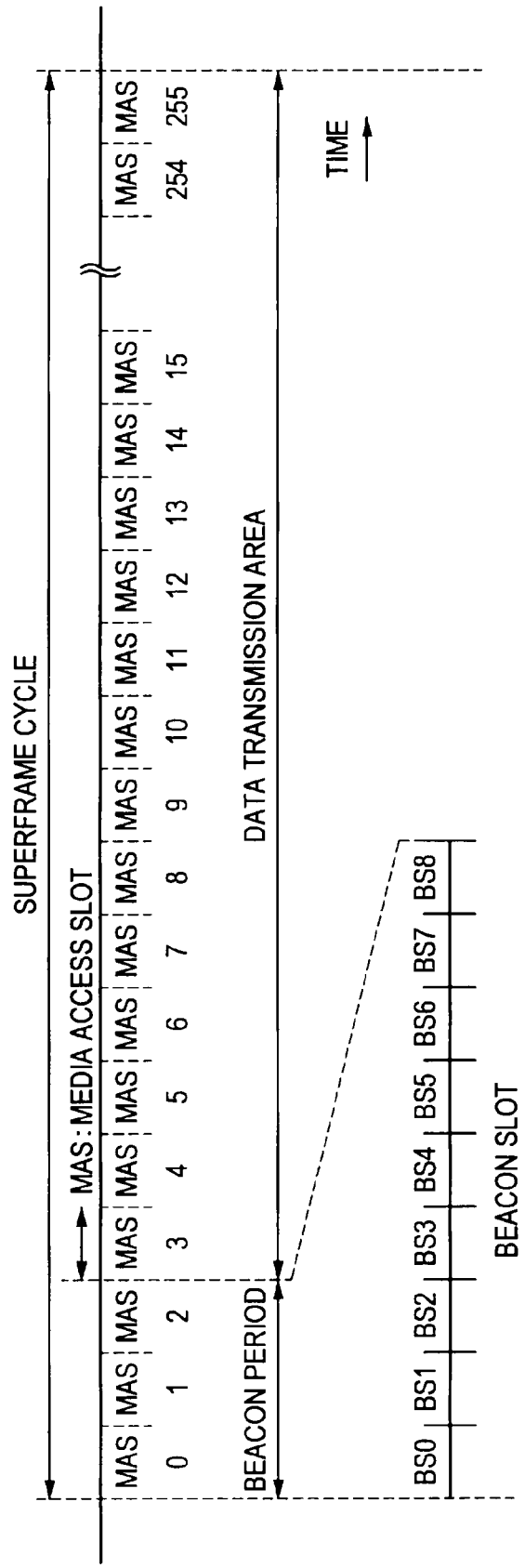
FIG. 2 is an explanatory figure that shows an example of a configuration of a superframe.

FIG. 2 is an explanatory figure that shows an example of a configuration of the superframe. A superframe cycle is defined as a specified period of time (for example, approximately 65 milliseconds), and it is segmented into two-hundred-fifty-six Media Access Slots (MASs). The wireless communication devices 10 that configure a single wireless network share the superframe cycle as a frame with a specified cycle, and they transmit messages using the segmented MASs as units.

Furthermore, at the beginning of the superframe, a beacon period (a BP) is provided as a control area for performing transmission and receiving of control information using the beacons, and beacon slots (BSs) are disposed at specified intervals within the BP. A unique beacon slot is set for each of the wireless communication devices 10, and parameters for performing network management and access control are exchanged among the wireless communication devices 10 in the vicinity. FIG. 2 shows an example in which nine beacon slots BS0 to BS8 are set as the beacon period.

—Configurations of Beacon and Information Elements

Next, configurations of the beacons that are transmitted and received by the wireless communication devices 10 and of information elements that are contained in the beacons will be explained with reference to FIGS. 3 to 7.

Figure 3:
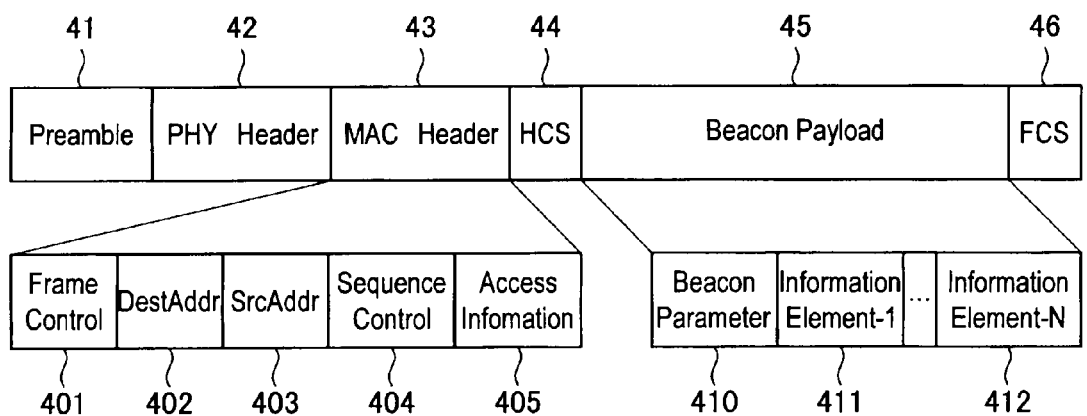
FIG. 3 is an explanatory figure that shows an example of a configuration of a beacon frame.

FIG. 3 is an explanatory figure that shows an example of a configuration of a beacon frame. As shown in FIG. 3, the beacon includes a Preamble 41, a PHY header 42, a MAC header 43, a Header Check Sequence (HCS) 44, a Beacon Payload 45, and a Frame Check Sequence (FCS) 46.

The MAC header 43, as shown in FIG. 3, includes Frame Control information 401, a Destination Address 402 that identifies the wireless communication device 10 on the receiving side, and a Source Address 403 that identifies the wireless communication device 10 on the transmitting side. The MAC header 43 also includes Sequence Control information 404, such as a sequence number and the like, and Access Control Information 405 in which the parameters that are necessary for access control are described.

In addition, as shown in FIG. 3, a Beacon Parameter 410 and Information Element-1 411 to Information Element-N 412 are provided as necessary in the Beacon Payload 45. Note that "N" indicates the number of the information elements that are appended to the beacon and transmitted, and the value of "N" varies from one transmission beacon to the next. Further, the beacon frame may be configured by adding and deleting the individual information elements as necessary. For example, the beacon may include a beacon period operation information element (BPO IE) as shown in FIG. 4 and information elements that pertain to electric power transmission, as shown in FIGS. 5 and 6.

Figure 4:
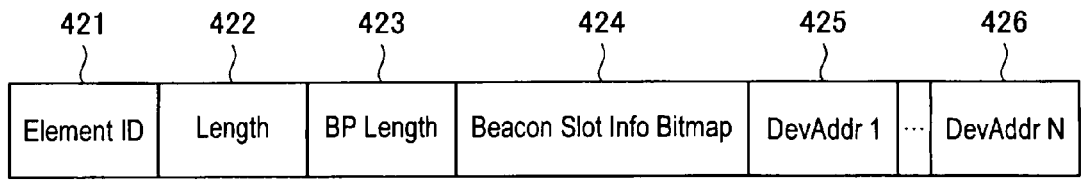
FIG. 4 is an explanatory figure that shows an example of a configuration of a beacon period operation information element.

FIG. 4 is an explanatory figure that shows an example of a configuration of the beacon period operation information element. As shown in FIG. 4, the beacon period operation information element includes an Element ID 421 that indicates that the information element is the beacon period operation information element, as well as an information Length 422 for the information element. The beacon period operation information element also includes a BP Length 423 that indicates the length of the beacon period, as well as a Beacon Slot Info Bitmap 424 that indicates an operational state of the beacon slot. Device addresses (DevAddr1 to DevAddrN) 425 to 426 of devices from which beacons have been received are also appended to the beacon period operation information element.

FIG. 5 is an explanatory figure that shows an example of a configuration of an electric power supply capability information element. The electric power supply capability information element is used by a wireless communication device 10 that is provided with an electric power supply function to notify the other wireless communication devices 10 that reside in the vicinity of its capability to supply electric power.

Specifically, the electric power supply capability information element, as shown in FIG. 5, includes an Element ID 431 that indicates that the information element is the electric power supply capability information element, as well as an information Length 432 for the information element. The electric power supply capability information element also includes a Power Supply Type 433 that indicates the type of electric power supply of which the device is capable, as well as an Available Power Level 434 that is the maximum electric power that can be supplied.

The type of electric power supply that is described in the Power Supply Type 433 may be an electromagnetic induction type, an electrical field resonance type, a magnetic field resonance type, a radio wave receiving type, or the like. The electromagnetic induction type is a type that uses coils on both the transmitting and the receiving sides and utilizes the electromotive force that is generated by changes in the magnetic flux between the coils. It is used for charging an electric toothbrush, for example.

The electrical field resonance type is a type that uses dielectric bodies on both the transmitting and the receiving sides and utilizes the resonance phenomenon of the electrical field that is generated between the dielectric bodies. The magnetic field resonance type is a type that uses RC resonators on both the transmitting and the receiving sides and utilizes the resonance phenomenon of the magnetic field that is generated between the RC resonators. The radio wave receiving type is a type that causes a high-frequency signal that is transmitted from the transmitting side to resonate with a resonator circuit on the receiving side and converts the signal into direct current electric power by rectifying the signal.

FIG. 6 is an explanatory figure that shows an example of a configuration of an electric power transmission request information element. The electric power transmission request information element is an information element for requesting the wireless communication devices 10 in the vicinity to supply electric power, as in a case where the electric power of the requesting device is insufficient or the like.

Specifically, the electric power transmission request information element, as shown in FIG. 6, includes an Element ID 441 that indicates that the information element is the electric power transmission request information element, as well as an information Length 442 for the information element. The electric power transmission request information element also includes a request device address (Request DevAddr) 443 that designates the wireless communication device 10 that is the electric power supply source, as well as a requested amount of electric power (Request Power) 444 that indicates the amount of electric power that is requested. The electric power transmission request information element also includes a request operating ratio (Request Duty Cycle) 445 that indicates a frequency with which the electric power supply is requested (for example, one time per three superframes or the like).

FIG. 7 is an explanatory figure that shows an example of a configuration a transmission MAS notification information element. The transmission MAS notification information element is configured such that, in a case where data will be transmitted to a specific wireless communication device 10, the destination wireless communication device 10 can be specified and the MAS that will be used for the transmission can be designated by a single information element.

Specifically, the transmission MAS notification information element, as shown in FIG. 7, includes an Element ID 451 that indicates that the information element is the transmission MAS notification information element, as well as an information Length 452 for the information element. The transmission MAS notification information element also includes a target device address (Target DevAddr) 453 that designates the wireless communication device 10 that will be the receiving destination. The transmission MAS notification information element also includes a Transmit Availability MAS Bitmap 454 that indicates, in a bitmap format, the MAS that is available for transmission.

2. Background

Next, the background of the present embodiment will be explained. In the WiMedia Distributed MAC Specification, a method is described for building an autonomous distributed wireless network by having individual wireless communication devices exchange beacon signals on a specified cycle. A method is also described for forming a superframe cycle on a specified cycle, placing a beacon period that includes a plurality of beacon slots in the beginning portion of the superframe cycle, and determining which beacon slot each of the wireless communication devices will use.

However, in the method that is described in the WiMedia Distributed MAC Specification, all of the wireless communication devices use non-directional antennas to ascertain one another's presence, so the communication range is limited. Moreover, the wireless communication devices are not able to determine in which directions the surrounding wireless communication devices are located.

On the other hand, an electric power transmission technology for transmitting electric power among a plurality of electric power communication devices has recently been proposed. According to the electric power transmission technology, electric power transmission from one of the electric power communication devices to another of the electric power communication devices is performed in a case where the plurality of the electric power communication devices are disposed such that they have specific positional relationships. Further, according to the electric power transmission technology, it is possible, for example, for transmission of several milliwatts to several hundred milliwatts to be performed within a short range of several meters.

With the electric power transmission technology described above, it is necessary for the electric power supply source device and the receiving destination device to be associated with one another in advance, and in order for electric power to be transmitted to a freely selected receiving destination device, a separate verification procedure must be performed for the electric power supply source device and the receiving destination device. However, in certain device verification methods, unique identification information that is set in the partner device must be set in advance. This creates a problem in that a user is forced to perform a setting operation on an identification information input screen, which imposes a burden on the user.

Note that a method has been conceived in which a setting is made in advance in each of the electric power communication devices that enables the device to exchange electric power only with a specific electric power communication device. In this case, it is possible to prevent electric power transmission from being performed wastefully, but a restriction is imposed in that electric power cannot be transmitted to a freely selected electric power communication device. Moreover, a problem exists with the electric power communication devices that use this method, in that it is difficult to perform electric power transmission between electric power communication devices that are disposed in unspecified directions.

Accordingly, the electric power communication device 10 according to the present embodiment has been invented to address this situation. According to the electric power communication device 10 according to the present embodiment, electric power transmission can be performed by appropriately controlling directionality between partner communication devices. Hereinafter, the electric power communication device 10 will be explained in detail with reference to FIGS. 8 to 14.

Figure 8:
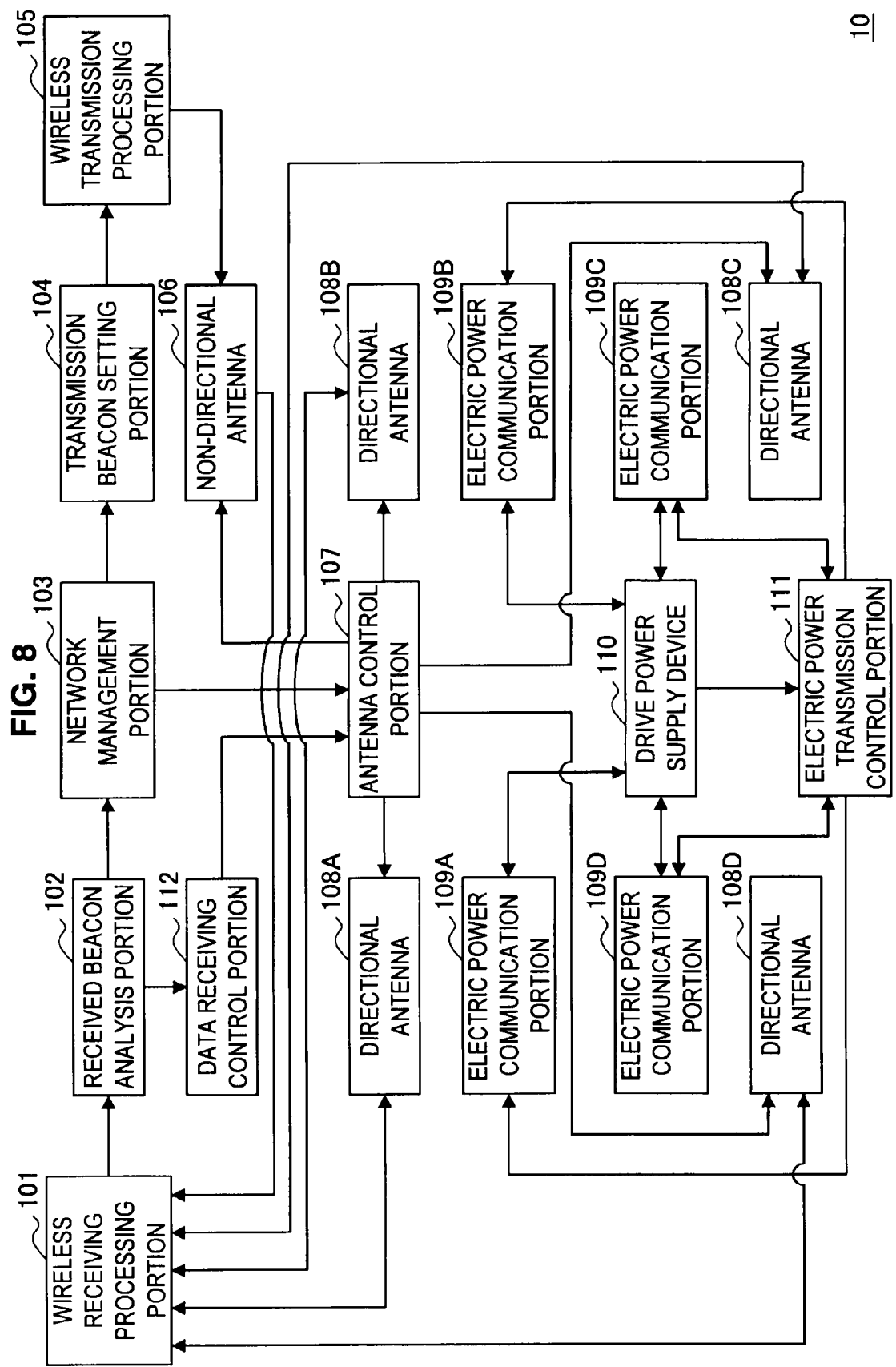
FIG. 8 is a functional block diagram that shows a configuration of a wireless communication device according to the embodiment.

3. Configuration of the Wireless Communication Device According to the Present Embodiment FIG. 8 is a functional block diagram that shows a configuration of the wireless communication device 10 according to the present embodiment. As shown in FIG. 8, the wireless communication device 10 is provided with a wireless receiving processing portion 101, a received beacon analysis portion 102, a network management portion 103, a transmission beacon setting portion 104, a wireless transmission processing portion 105, and a non-directional antenna 106. The wireless communication device 10 is also provided with an antenna control portion 107, a plurality of directional antennas 108A to 108D, a plurality of electric power communication portions 109A to 109D, a drive power supply device 110, and an electric power transmission control portion 111.

The wireless receiving processing portion 101 processes wireless signals (for example, beacons) that are received from one of the non-directional antenna 106 and the directional antennas 108A to 108D. Specifically, the wireless receiving processing portion 101 performs a down conversion of the signal to a baseband signal, then converts the baseband signal into a bit string based on a constellation. The wireless receiving processing portion 101 includes a function as a receiving detection portion that detects receiving of the signal from one of the non-directional antenna 106 and the directional antennas 108A to 108D.

The received beacon analysis portion 102 analyzes the beacons that are processed by the wireless receiving processing portion 101. The network management portion 103 manages the wireless communication devices 10 that reside in the vicinity, based on the antennas that receive the beacons, the parameters that are described in the beacons, and the like. Note that a specific example of the management by the network management portion 103 will be described later with reference to FIG. 12.

The transmission beacon setting portion 104 performs the setting of the parameters that are described in the beacons that the wireless communication device 10 will transmit. For example, the transmission beacon setting portion 104 sets the parameters in the electric power transmission request information element as necessary and appends the information element to the beacon.

The wireless transmission processing portion 105 converts into high-frequency signals the beacons that have been set by the transmission beacon setting portion 104, then transmits the signals from the non-directional antenna 106. Note that the beacons may also be transmitted from one of the plurality of directional antennas 108A to 108D.

The non-directional antenna 106 does not have any directionality, and it receives wireless signals that are transmitted in its vicinity and transmits wireless signals. The directional antennas 108A to 108D do have directionalities, and each one receives wireless signals that are transmitted from a specific direction and transmits wireless signals in the specific direction.

The antenna control portion 107 controls which one of the non-directional antenna 106 and the directional antennas 108A to 108D is used for communication. For example, in a case where the direction in which the wireless communication device 10 that will be the data transmission destination resides is already known, the antenna control portion 107 may set the directional antenna 108 that corresponds to the direction in which the wireless communication device 10 resides as the antenna to be used. Similarly, in a case where the direction in which the wireless communication device 10 that will be the data transmission source resides is already known, the antenna control portion 107 may set the directional antenna 108 that corresponds to the direction in which the wireless communication device 10 resides as the antenna to be used. An example of the control of the receiving antenna by the antenna control portion 107 during the beacon period will be described later with reference to FIGS. 10 and 11.

The electric power communication portions 109A to 109D have directionalities, and each one receives electric power that is transmitted from a specific direction and transmits electric power in the specific direction. The drive power supply device 110 supplies electric power to the electric power communication portions 109A to 109D and receives electric power from the electric power communication portions 109A to 109D.

The electric power transmission control portion 111 functions as an electric power communication control portion that controls which of the electric power communication portions 109A to 109D is used for electric power transmission to and from the partner communication device, in accordance with the directional antenna 108 that received the beacon that was transmitted from the partner communication device. For example, the electric power transmission control portion 111 causes the electric power communication portion 109 that it has determined will be used for electric power transmission to and from the partner communication device to perform the transmission of the electric power that is supplied from the drive power supply device 110.

Figure 9:
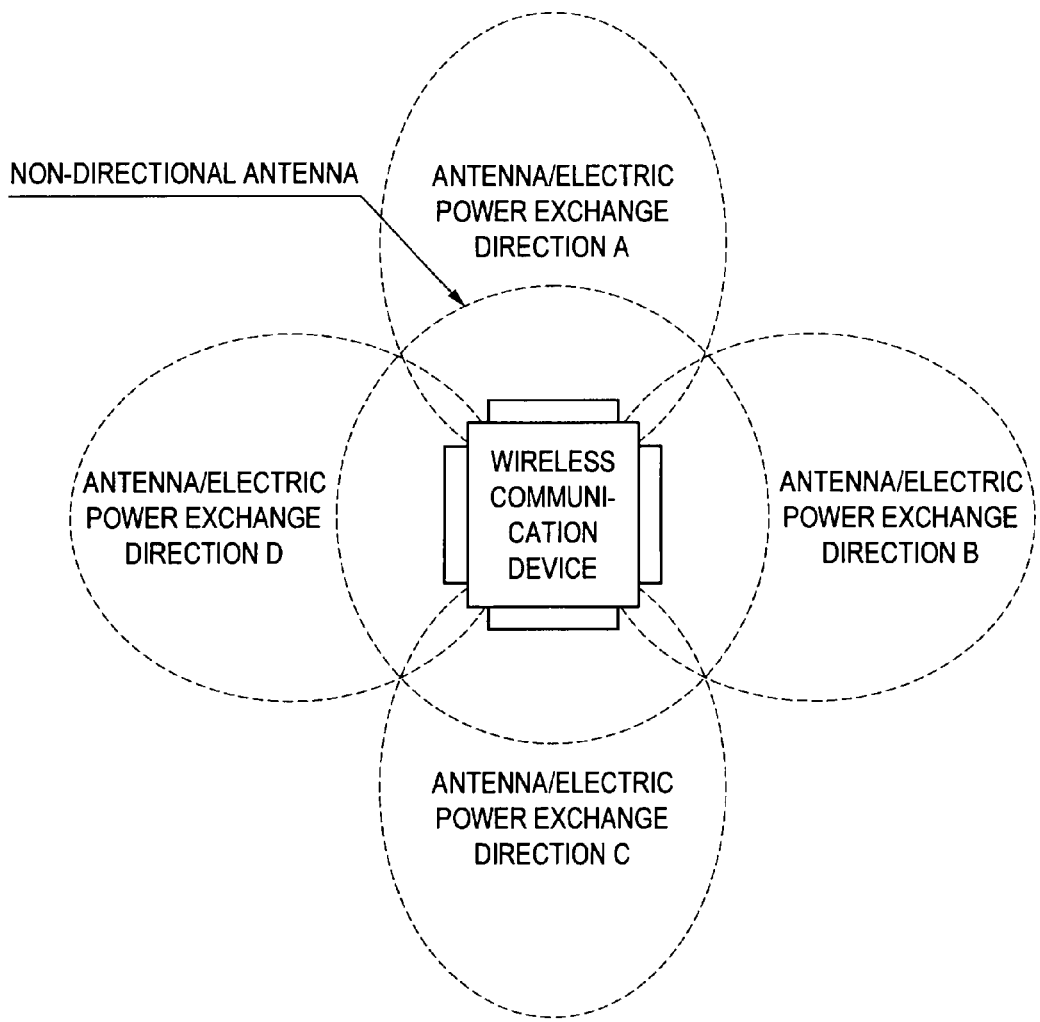
FIG. 9 is an explanatory figure that schematically shows directionalities of directional antennas and electric power communication portions.

FIG. 9 is an explanatory figure that schematically shows the directionalities of directional antennas 108A to 108D and the electric power communication portions 109A to 109D. In FIG. 9, an antenna/electric power exchange direction A indicates the direction in which the directional antenna 108A and the electric power communication portion 109A are oriented, and an antenna/electric power exchange direction B indicates the direction in which the directional antenna 108B and the electric power communication portion 109B are oriented. In the same manner, an antenna/electric power exchange direction C indicates the direction in which the directional antenna 108C and the electric power communication portion 109C are oriented, and an antenna/electric power exchange direction D indicates the direction in which the directional antenna 108D and the electric power communication portion 109D are oriented.

Note that FIG. 9 shows an example in which the directions in which the directional antennas 108A to 108D are oriented respectively match the directions in which the electric power communication portions 109A to 109D are oriented, but the directional antennas 108A to 108D and the electric power communication portions 109A to 109D may also be respectively oriented in different directions. Note also that the number of the directional antennas 108 and the number of the electric power communication portions 109 are not limited to being four, and they may be any number that is at least two. Furthermore, the number of the directional antennas 108 and the number of the electric power communication portions 109 may also be different.

Next, an example of the control of the receiving antenna by the antenna control portion 107 will be explained with reference to FIGS. 10 and 11.

Figure 10:
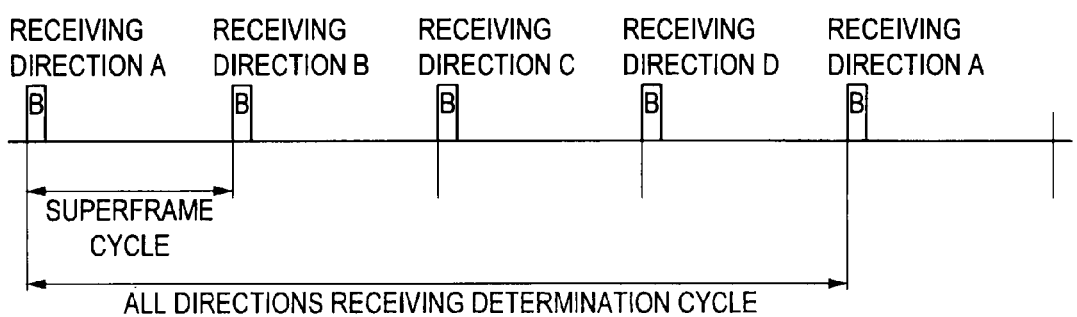
FIG. 10 is an explanatory figure that shows an example of receiving antenna control by an antenna control portion.

FIG. 10 is an explanatory figure that shows an example of the receiving antenna control by the antenna control portion 107. As shown in FIG. 10, the antenna control portion 107 switches the receiving direction for the beacon period in each of the superframes by sequentially switching which of the directional antennas 108A to 108D is used for receiving.

More specifically, the antenna control portion 107 can implement receiving from all directions by switching among a receiving direction A, a receiving direction B, a receiving direction C, and a receiving direction D with each of the superframes. When four superframes have elapsed, completing an all directions beacon receiving cycle, the antenna control portion 107 once again switches the receiving direction to the receiving direction A and continues switching the receiving direction by switching the directional antenna 108. Note that FIG. 10 shows an example in which the receiving direction is switched with the beacon period in each of the superframes, but the receiving direction may also be maintained through the beacon periods of a plurality of the superframes.

Figure 11:
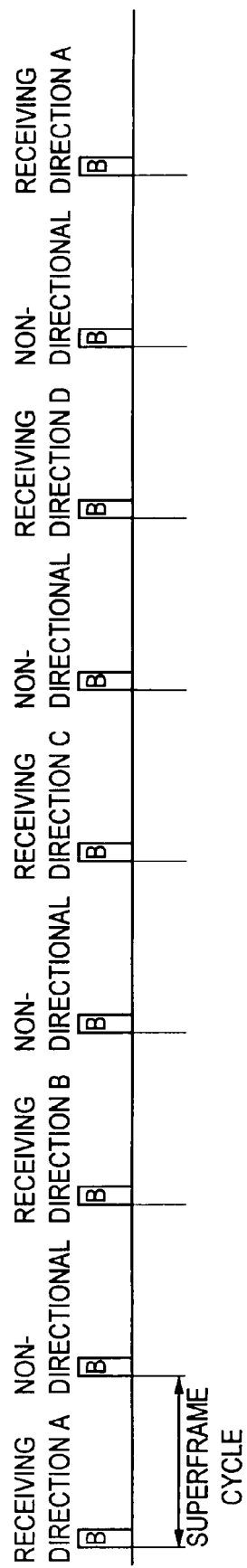
FIG. 11 is an explanatory figure that shows another example of the receiving antenna control by the antenna control portion.

FIG. 11 is an explanatory figure that shows another example of the receiving antenna control by the antenna control portion 107. As shown in FIG. 11, the antenna control portion 107 may also switch the receiving direction for the beacon period in each of the superframes by sequentially switching which of the directional antennas 108A to 108D and the non-directional antenna 106 is used for receiving.

More specifically, every time the superframe changes, the antenna control portion 107 may switch among the receiving direction A, non-directional receiving, the receiving direction B, non-directional receiving, the receiving direction C, non-directional receiving, the receiving direction D, and non-directional receiving, in that order. In this configuration, receiving is performed by the non-directional antenna 106 in every other one of the superframes, so the beacons that are transmitted from each of the wireless communication devices 10 in the vicinity can be received in a single cycle of two superframes.

Next, the management of the wireless communication devices 10 in the vicinity by the network management portion 103 will be explained in concrete terms.

FIG. 12 is an explanatory figure that shows a concrete example of a control table that is managed by the network management portion 103. More specifically, the control table is assumed to be a control table that is managed by the network management portion 103 of the wireless communication device 10C that is shown in FIG. 1. As shown in FIG. 12, the network management portion 103 manages the control table by associating a beacon slot usage state, an address of the device being used, the presence or absence of a moving display (a movable marker display), an application parameter, and the like with each of the beacon slots.

Furthermore, in the present embodiment, the network management portion 103 manages the control table for each of the beacon slots by determining the beacon receiving direction in a case where the full range of the directions spans 360 degrees, based on which of the directional antennas 108A to 108D receives the beacon.

For example, the network management portion 103 may determine that the receiving direction is zero degrees in a case where the beacon is received by the directional antenna 108A, and may also determine that the receiving direction is ninety degrees in a case where the beacon is received by the directional antenna 108B. In the same manner, the network management portion 103 may determine that the receiving direction is 180 degrees in a case where the beacon is received by the directional antenna 108C, and may also determine that the receiving direction is 270 degrees in a case where the beacon is received by the directional antenna 108D.

Moreover, in a case where the beacon is received by a plurality of the directional antennas 108, the network management portion 103 may determine that the receiving direction is an intermediate value among the directions of the plurality of the directional antennas 108. For example, in a case where the beacon is received by the directional antennas 108A and 108B, the network management portion 103 may determine that the receiving direction is forty-five degrees.

As shown in FIG. 12, the beacon slots 0 and 1 are slots for signaling, so the beacons are never received in those slots. Further, the beacon slot 2 is being used as an ordinary beacon slot by the wireless communication device 10B (address=0x2222), and the receiving direction corresponds to 270 degrees.

The beacon slot 3 is registered as a beacon slot that is being used by the wireless communication device 10C (address=0x3333) itself. The beacon slot 4 is being used as an ordinary beacon slot by the wireless communication device 10D (address=0x4444), and the receiving direction corresponds to ninety degrees.

The beacon slot 5 is being used as an ordinary beacon slot by the wireless communication device 10E (address=0x5555), and the receiving direction corresponds to 180 degrees.

In addition, the network management portion 103 can use the beacon period operation information element that is transmitted from the wireless communication device 10B, which is using the beacon slot 2, to ascertain that the beacon slot 6 is being used. That is, by receiving the beacon that is transmitted from the wireless communication device 10B that is one hop away, the network management portion 103 can ascertain the presence of the wireless communication device 10A that resides two hops away from the wireless communication device 10C.

Therefore, the beacon slot 6 is associated with a usage state of proximate detection, an address of 0x1111, a receiving direction value that indicates the device is out of range, and an application parameter of "Undetermined". The beacon slots 7 and 8 are not currently being used, but will be used in a case where another wireless communication device 10 newly appears.

Based on the control table described above, the electric power transmission control portion 111 controls the electric power communication portion 109 that is used for electric power transmission to and from the partner device. For example, for electric power transmission, the electric power transmission control portion 111 uses the electric power communication portion 109 whose direction is closest to the receiving direction that is associated with the partner communication device in the control table. This configuration makes it possible for electric power to be transmitted in the direction of the partner communication device and received from the direction of the partner communication device, so it can make electric power transmission more efficient.

4. Operation of the Wireless Communication Device According to the Present Embodiment The configuration of the wireless communication devices 10 according to the present embodiment has been explained with reference to FIGS. 8 to 12. Next, operations of the wireless communication devices 10 according to the present embodiment will be explained with reference to FIGS. 13 and 14.

Figure 13:
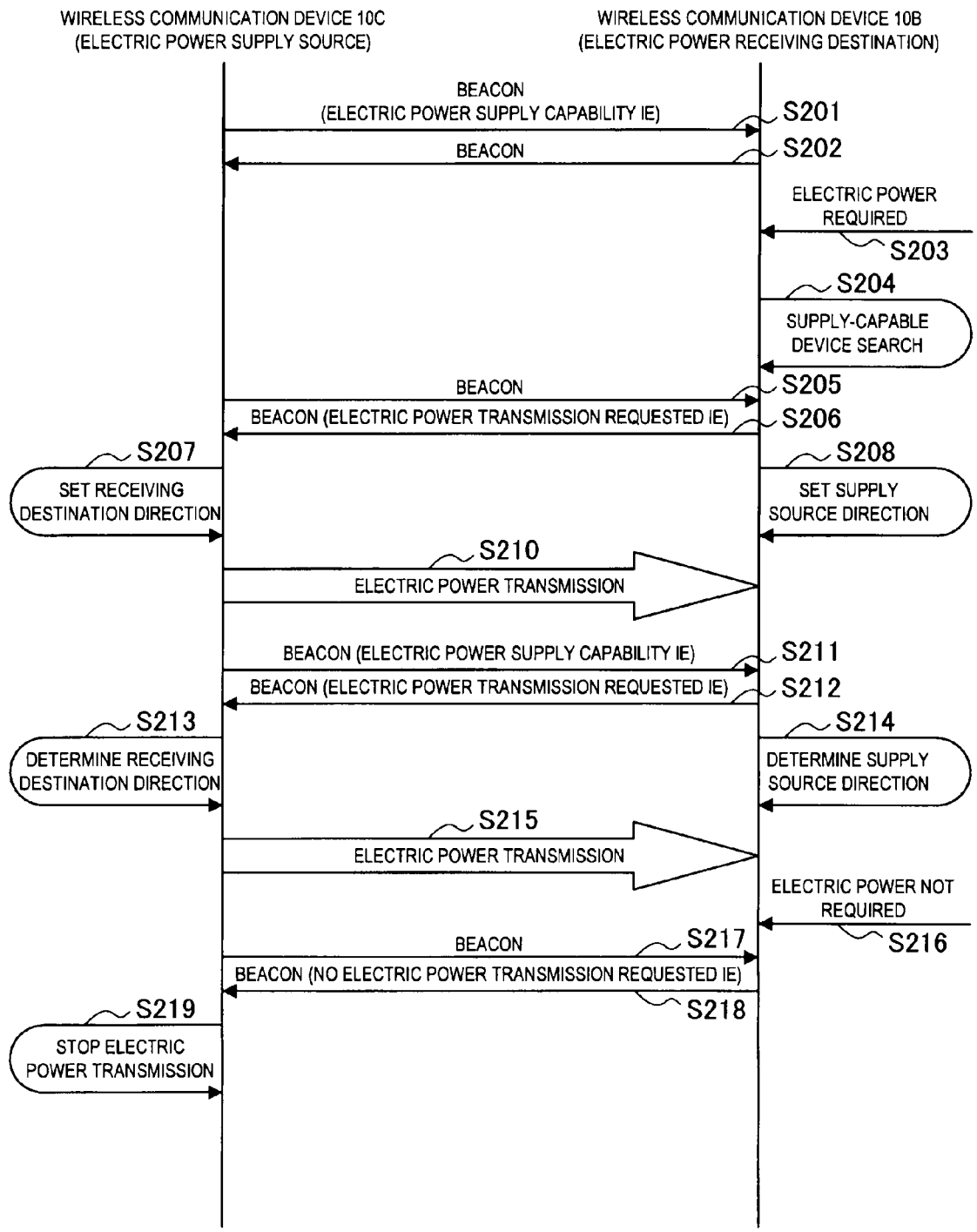
FIG. 13 is a sequence chart that shows a flow of operations of the wireless communication device according to the embodiment.

FIG. 13 is a sequence chart that shows a flow of operations of the wireless communication devices 10 according to the present embodiment. FIG. 13 shows a sequence by which the wireless communication device 10C and the wireless communication device 10B use the information elements in the beacons that they exchange at regular intervals to begin electric power transmission. The sequence in explained in detail below.

First, the wireless communication device 10C transmits a beacon that contains the electric power supply capability information element (Step S201), and the wireless communication device 10B also transmits a beacon (Step S202). Next, the network management portions 103 of the wireless communication device 10C and the wireless communication device 10B record the parameters such as the receiving directions, the addresses that are contained in the received beacons, and the like in the control tables. Note that the wireless communication devices 10B and 10C use their non-directional antennas 106 to transmit the beacons and switch among the directional antennas 108A to 108D with each of the superframes to receive the beacons.

Thereafter, in the wireless communication device 10B, when it is determined that electric power is required (Step S203), the transmission beacon setting portion 104 searches in the control table for a wireless communication device 10 that is capable of supplying electric power (Step S204).

The wireless communication device 10C then transmits a beacon (Step S205), and the wireless communication device 10B transmits a beacon that contains the electric power transmission request information element to the wireless communication device 10C, which is capable of supplying electric power (Step S206). Note that the wireless communication device 10C transmits the beacon that contains the electric power supply capability information element on a specified cycle, so the beacon that is transmitted at Step S205 does not contain the electric power supply capability information element.

When the wireless communication device 10C receives the beacon that contains the electric power transmission request information element, the electric power transmission control portion 111 of the wireless communication device 10C refers to the control table and sets for use the electric power communication portion 109 that corresponds to the direction in which the wireless communication device 10B that is the electric power receiving destination resides (Step S207). In the same manner, the wireless communication device 10B sets for use the electric power communication portion 109 that corresponds to the direction in which the wireless communication device 10C resides (Step S208).

Thereafter, the electric power communication portion 109 that has been set for use in the wireless communication device 10C starts electric power transmission to the wireless communication device 10B (Step S210).

When the next superframe period arrives, the wireless communication device 10C transmits a beacon that contains the electric power supply capability information element in which an electric power supply status has been updated (Step S211). For its part, the wireless communication device 10B continuously transmits a beacon that contains the electric power transmission request information element, which requests continuation of the electric power transmission (Step S212). Note that FIG. 13 shows an example in which the wireless communication device 10B transmits the beacons that contain the electric power transmission request information element throughout the time that it requests the electric power transmission, but the wireless communication device 10B may also determine the timing at which the electric power transmission ends in conjunction with the wireless communication device 10C.

Next, the wireless communication devices 10C and 10B determine the receiving direction based on which of the directional antennas 108A to 108D received the beacons (Steps S213, S214). Then the wireless communication devices 10C and 10B perform the electric power transmission using the electric power communication portions 109 within whose directions of orientation the partner communication devices reside (Step S215).

Next, when the wireless communication device 10B no longer requires electric power (Step S216), the wireless communication device 10B transmits a beacon that does not contain the electric power transmission request information element (Step S218). Because the electric power transmission request information element is not contained in the beacon from the wireless communication device 10B, the wireless communication device 10C stops the electric power transmission (Step S219).

Figure 14:
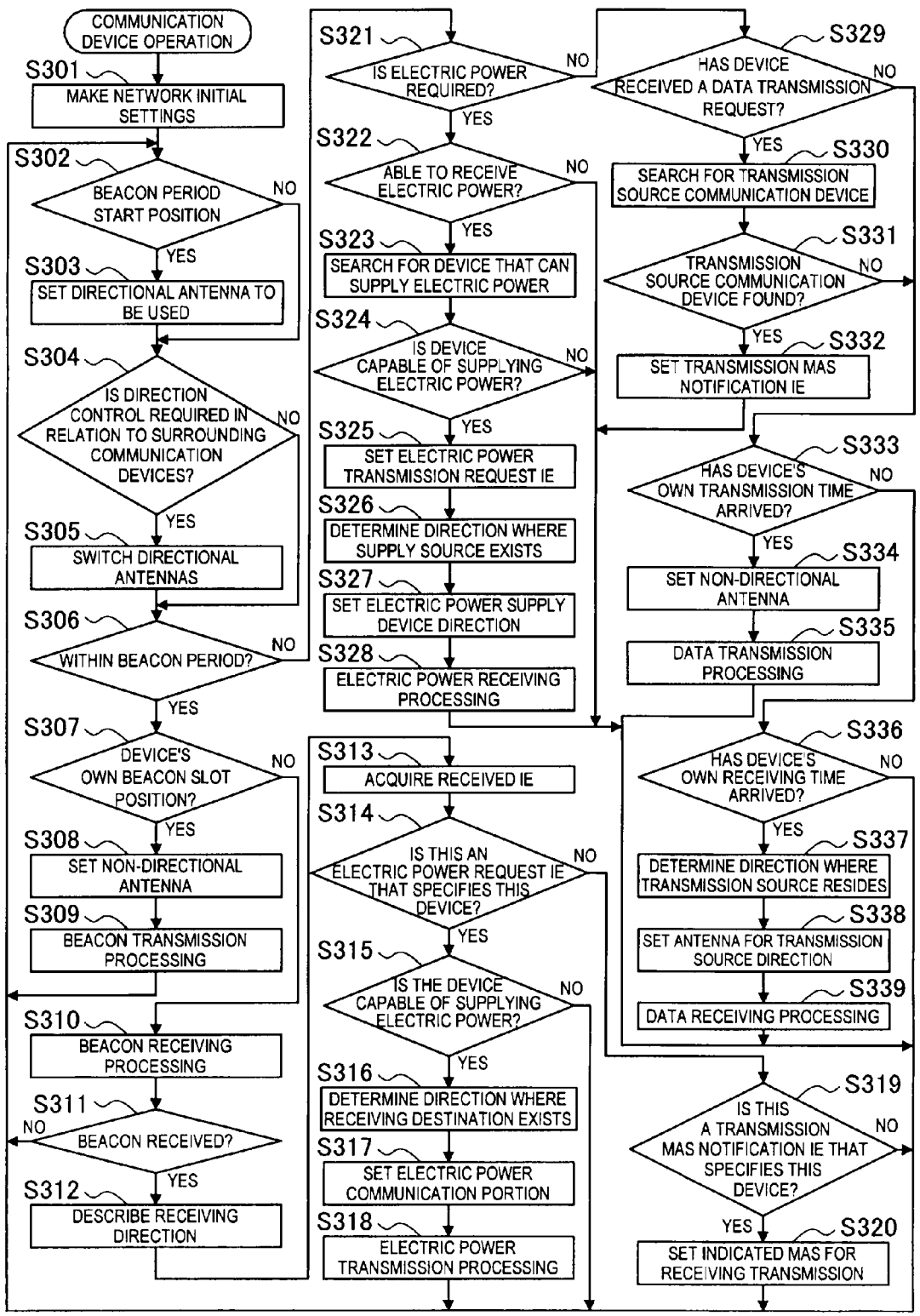
FIG. 14 is a flowchart that shows the flow of operations of the wireless communication device according to the embodiment.

FIG. 14 is a flowchart that shows the flow of operations of the wireless communication device 10 according to the present embodiment. First, when the power supply is turned on, the wireless communication device 10 receives the beacons that are transmitted from the wireless communication devices 10 in the vicinity and makes initial settings for network operations, such as setting the superframe cycle, the beacon transmission slots, and the like (Step S301).

Next, in a case where the start position of the beacon period has arrived (Step S302), the antenna control portion 107 of the wireless communication device 10 sets the directional antenna 108 that it will use (Step S303). Then, if direction control is required in relation to the wireless communication devices 10 in the vicinity (Step S304), the antenna control portion 107 switches the directional antennas 108 (Step S305). Specifically, the antenna control portion 107 may set one of the non-directional antenna 106 and any one of the directional antennas 108 to be used in the signaling slots and the open slots in the beacon period.

Within the beacon period (Step S306), if the beacon slot is for the wireless communication device 10 itself (Step S307), the antenna control portion 107 sets the non-directional antenna 106 as the antenna to be used (Step S308). The beacon is therefore transmitted from the non-directional antenna 106 (Step S309).

If the beacon slot is not for the wireless communication device 10 itself, the wireless receiving processing portion 101 performs beacon receiving processing (Step S310). If a beacon is received (Step S311), the network management portion 103 records in the control table the value for the receiving direction that corresponds to the directional antenna 108 that is being used (Step S312).

Next, the wireless communication device 10 acquires and analyzes the received information element (Step S313), and if the information element is an electric power transmission request information element that designates the wireless communication device 10 itself as the electric power supply source (Step S314), the wireless communication device 10 determines whether it is capable of supplying received power (Step S315). In a case where the wireless communication device 10 is capable of supplying received power, the electric power transmission control portion 111 refers to the control table to determine the direction in which the wireless communication device 10 that is the receiving destination resides (Step S316), sets the electric power communication portion 109 that will be used (Step S317), and starts the electric power transmission (Step S318).

If the received information element is a transmission MAS notification information element that specifies the wireless communication device 10 itself as the receiving destination (Step S319), the wireless communication device 10 sets the MAS that is indicated in the information element as the timing at which a transmission will be received (Step S320).

In contrast, in a case where electric power is required at a time other than the beacon period (Step S321), the wireless communication device 10 determines whether or not it is capable of receiving electric power (Step S322), and if it can receive electric power, it searches in the control table for another wireless communication device 10 that resides within the range in which it is possible to supply electric power (Step S323).

If another wireless communication device 10 exists that is capable of supplying electric power (Step S324), the wireless communication device 10 sets in its beacon an electric power transmission request information element that is addressed to the other wireless communication device 10 (Step S325). Next, the electric power transmission control portion 111 refers to the control table to determine the direction in which the wireless communication device 10 that is the electric power supply source resides (Step S326), sets the electric power communication portion 109 that will be used (Step S327), and performs electric power receiving processing (Step S328).

In a case where the wireless communication device 10 receives, for example, a data transmission request from a connected application device (Step S329), the wireless communication device 10 searches in the control table for the other wireless communication device 10 that is the source of the transmission (Step S330). If the other wireless communication device 10 that is the transmission source is found in the control table (Step S331), the wireless communication device 10 constructs a transmission MAS notification information element (Step S332).

In a case where the transmission time for the wireless communication device 10 has arrived (Step S333), the antenna control portion 107 of the wireless communication device 10 sets the non-directional antenna 106, for example, as the antenna to be used (Step S334), and data transmission from the non-directional antenna 106 is performed (Step S335). In a case where the receiving time for the wireless communication device 10 that has been set by exchanging beacons has arrived (Step S336), the antenna control portion 107 refers to the control table to determine the direction in which the wireless communication device 10 that will be the data transmission source resides (Step S337). The antenna control portion 107 then sets which one of the directional antennas 108A to 108D will be used (Step S338), and data receiving processing is performed (Step S339). Note after each of the processing sequences described above, the processing returns to Step S302 and is performed repeatedly.

5. Conclusion and Supplement

As explained above, the wireless communication device 10 according to the present embodiment is capable of determining its positional relationship to the partner communication device by exchanging beacons at regular intervals, and is capable of performing electric power transmission using the electric power communication portion 109 that matches the direction in which the partner communication device resides. The wireless communication device 10 can therefore perform electric power transmission efficiently in the direction in which the partner communication device resides. The wireless communication device 10 can also efficiently receive electric power that is transmitted from the partner communication device.

Specifically, the wireless communication device 10 according to the present embodiment is provided with the plurality of the directional antennas 108A to 108D that each have directionality in a different direction, and it can determine the direction in which the partner communication device resides by switching the directional antenna 108 that it uses with each beacon period.

Further, in a case where, after the wireless communication device 10 has started electric power transmission, it becomes impossible to confirm the partner communication device using the beacons, the wireless communication device 10 can cancel the electric power transmission to avoid discharging electric power unnecessarily.

Note that a preferred embodiment of the present invention has been explained with reference to the attached drawings, but the present invention is obviously not limited to the example that has been explained. It should be understood by those skilled in the art that various modifications, combinations, sub-combinations and alterations may occur depending on design requirements and other factors insofar as they are within the scope of the appended claims or the equivalents thereof.

For example, the various steps in the processing by the wireless communication device 10 in this specification are not necessarily performed in a temporal sequence in the order in which they are described in the sequence chart and the flowchart. The various steps in the processing by the wireless communication device 10 may, for example, be incorporated into processing that is performed one of in parallel and separately (for example, one of parallel processing and object-oriented processing).

Furthermore, a computer program can also be created to perform functions that are equivalent to those of configuring hardware elements of the wireless communication device 10 that is described above, such as a CPU, a ROM, a RAM, and the like that are built into the wireless communication device 10. A storage medium that stores the computer program may also be provided. The processing sequences described above can also be implemented in the form of hardware by configuring as hardware the individual functional blocks that are shown in the functional block diagram in FIG. 8.

The present application contains subject matter related to that disclosed in Japanese Priority Patent Application JP 2008-283430 filed in the Japan Patent Office on 4 Nov. 2008, the entire content of which is hereby incorporated by reference.

What is claimed is:

1. An electric power communication device, comprising:
a plurality of directional antennas, each of which has directionality;
a plurality of electric power communication portions, each of which has directionality, is configured to transmit and receive electrical power, and is associated with a different one of or combination of the plurality of directional antennas;
an electric power communication control portion configured to select one of the plurality of electric power communication portions to use for electric power communication with a partner communication device, based on which one of the plurality of directional antennas receives an incoming wireless signal transmitted from the partner communication device;
a receiving detection portion that detects which one of the plurality of directional antennas receives the incoming wireless signal;
an antenna control portion that sequentially switches among the plurality of directional antennas,
wherein the receiving detection portion also detects, based on the contents of the incoming wireless signal transmitted from the partner communication device, a time slot in which the incoming wireless signal will be transmitted later from the partner communication device, and
the antenna control portion switches, for the time slot that has been detected by the receiving detection portion, to the one of the plurality of directional antennas that received the incoming wireless signal that was transmitted from the partner communication device.

2. The electric power communication device according to claim 1, further comprising:
a non-directional antenna,
wherein the antenna control portion sequentially switches among the plurality of directional antennas and the non-directional antenna.

3. The electric power communication device according to claim 2,
wherein the electric power communication control portion uses, for the electric power communication with the partner communication device, the electric power communication portion whose directionality is closest to that of the directional antenna whose receiving of the incoming wireless signal has been detected by the receiving detection portion.

4. The electric power communication device according to claim 3,
wherein transmitting of an outgoing wireless signal is performed by the non-directional antenna.

5. The electric power communication device according to claim 4,
wherein the receiving detection portion, based on the incoming wireless signal that was transmitted from the partner communication device, also detects a time slot in which the incoming wireless signal will be transmitted later from the partner communication device, and
the antenna control portion switches, for the time slot that has been detected by the receiving detection portion, to the directional antenna whose receiving of the incoming wireless signal that was transmitted from the partner communication device has been detected.

6. The electric power communication device according to claim 1,
wherein the electric power communication control portion is configured to select the one of the plurality of electric power communication portions associated with the one of the plurality of directional antennas that receives the signal.

7. An electric power communication system, comprising:
a first electric power communication device; and
a second electric power communication device that includes
a plurality of directional antennas, each of which has directionality;
a plurality of electric power communication portions, each of which has directionality, is configured to transmit and receive electrical power, and is associated with a different one of or combination of the plurality of directional antennas; and
an electric power communication control portion configured to select one of the plurality of electric power communication portions to use for electric power communication with the first communication device, based on which one of the plurality of directional antennas receives an incoming wireless signal transmitted from the first communication device,
a receiving detection portion that detects which one of the plurality of directional antennas receives the incoming wireless signal, and
an antenna control portion that sequentially switches among the plurality of directional antennas
wherein the receiving detection portion also detects, based on the contents of the incoming wireless signal transmitted from the first electric power communication device, a time slot in which the incoming wireless signal will be transmitted later from the first electric power communication device, and
the antenna control portion switches, for the time slot that has been detected by the receiving detection portion, to the one of the plurality of directional antennas that received the incoming wireless signal that was transmitted from the first electric power communication device.

8. An electric power communication method, comprising the steps of:
transmitting an incoming wireless signal from a partner communication device;
detecting receipt of the incoming wireless signal by one of a plurality of directional antennas, each of which has directionality;
selecting one of a plurality of electric power communication portions, each of which has directionality, to use for electric power communication with the partner communication device, based on which one of the plurality of directional antennas is detected to receive the incoming wireless signal transmitted from the partner communication device, each of the plurality of electric power communication portions being configured to transmit and receive electrical power and associated with a different one of or combination of the plurality of directional antennas; and
sequentially switching among the plurality of directional antennas,
wherein, based on the contents of the incoming wireless signal transmitted from the partner communication device, a time slot in which the incoming wireless signal will be transmitted later from the partner communication device is detected, and
for the time slot that has been detected by the receiving detection portion, the one of the plurality of directional antennas that received the incoming wireless signal that was transmitted from the partner communication device is switched to.

9. A non-transitory computer storage medium having program instructions stored thereon that when executed by a computer cause the computer to perform the steps of:
detecting an incoming wireless signal that has been transmitted by a partner communication device and has been received by one of a plurality of directional antennas, each of which has directionality;
selecting one of a plurality of electric power communication portions, each of which has directionality, to use for electric power communication with the partner communication device, based on which one of the plurality of directional antennas received the incoming wireless signal transmitted from the partner communication device, each of the plurality of electric power communication portions being configured to transmit and receive electrical power and associated with a different one of or combination of the plurality of directional antennas, and
sequentially switching among the plurality of directional antennas
wherein, based on the contents of the incoming wireless signal transmitted from the partner communication device, a time slot in which the incoming wireless signal will be transmitted later from the partner communication device is detected, and
for the time slot that has been detected by the receiving detection portion, the one of the plurality of directional antennas that received the incoming wireless signal that was transmitted from the partner communication device is switched to.

* * * * *